US012188375B2

(12) United States Patent
Kang et al.

(10) Patent No.: US 12,188,375 B2
(45) Date of Patent: Jan. 7, 2025

(54) STRUCTURE FOR ASSEMBLING TURBINE BLADE SEALS AND GAS TURBINE INCLUDING THE SAME

(71) Applicant: DOOSAN ENERBILITY CO., LTD, Changwon-si (KR)

(72) Inventors: Joo Hyung Kang, Buk-gu (KR); Iurii Goroshchak, Gimhae-si (KR); Oleksiy Korepin, Gimhae-si (KR)

(73) Assignee: Doosan Enerbility Co., Ltd., Changwon-si (KR)

( * ) Notice: Subject to any disclaimer, the term of this patent is extended or adjusted under 35 U.S.C. 154(b) by 0 days.

(21) Appl. No.: 18/109,776

(22) Filed: Feb. 14, 2023

(65) Prior Publication Data

US 2023/0258095 A1 Aug. 17, 2023

(30) Foreign Application Priority Data

Feb. 15, 2022 (KR) ........................ 10-2022-0019744

(51) Int. Cl.
*F01D 5/30* (2006.01)
*F01D 5/18* (2006.01)

(52) U.S. Cl.
CPC ............. *F01D 5/3015* (2013.01); *F01D 5/18* (2013.01); *F01D 5/30* (2013.01); *F01D 5/3007* (2013.01);
(Continued)

(58) Field of Classification Search
CPC ........ F01D 5/30; F01D 5/3007; F01D 5/3015; F01D 5/081; F01D 5/082; F01D 5/18;
(Continued)

(56) References Cited

U.S. PATENT DOCUMENTS

2005/0232751 A1* 10/2005 Townes .................... F01D 5/088 415/115
2008/0181768 A1* 7/2008 Brucher ................ F01D 5/3015 415/170.1
(Continued)

FOREIGN PATENT DOCUMENTS

EP 1840338 A1 10/2007
JP 07259505 A1 10/1995
(Continued)

OTHER PUBLICATIONS

European Search Report, In Corresponding European Application No. 23156807, Dated Jul. 10, 2023.

*Primary Examiner* — Elton K Wong
(74) *Attorney, Agent, or Firm* — Shook, Hardy & Bacon L.L.P.

(57) ABSTRACT

A structure for assembling turbine blade seals, which includes a turbine blade including an airfoil, a platform, and a root, a turbine rotor disk to which the root of the turbine blade is mounted, a seal plate mounted between the platform and one side of the turbine rotor disk to seal a cooling channel defined within the root and the platform, and an insertion pin inserted through the turbine rotor disk to fix the seal plate to the turbine rotor disk by supporting the seal plate, wherein the turbine rotor disk has a mounting groove into which a radially inner end of the seal plate is inserted, and the seal plate has a jaw portion radially supported by a stepped portion of the mounting groove.

22 Claims, 10 Drawing Sheets

(52) U.S. Cl.
CPC .... *F05D 2220/323* (2013.01); *F05D 2230/60* (2013.01); *F05D 2230/64* (2013.01); *F05D 2240/24* (2013.01); *F05D 2240/55* (2013.01); *F05D 2260/20* (2013.01)

(58) Field of Classification Search
CPC ............. F05D 2230/60; F05D 2230/64; F05D 2220/323; F05D 2240/24; F05D 2240/55; F05D 2260/30; F05D 2260/31
See application file for complete search history.

(56) References Cited

U.S. PATENT DOCUMENTS

| | | | | |
|---|---|---|---|---|
| 2008/0267778 | A1 | 10/2008 | Stamps et al. | |
| 2009/0148298 | A1 | 6/2009 | Strohl et al. | |
| 2011/0200448 | A1* | 8/2011 | Elliott | F01D 5/081 416/220 R |
| 2012/0039719 | A1 | 2/2012 | Ahaus et al. | |
| 2012/0128504 | A1* | 5/2012 | Ahaus | F01D 5/323 416/97 R |
| 2012/0177499 | A1 | 7/2012 | Helmis et al. | |
| 2017/0114650 | A1* | 4/2017 | Snyder | F01D 5/066 |
| 2017/0292396 | A1 | 10/2017 | Matthews et al. | |
| 2018/0023401 | A1 | 1/2018 | Hoell et al. | |
| 2018/0135440 | A1* | 5/2018 | Wines | F01D 5/3015 |
| 2019/0010818 | A1 | 1/2019 | Lambert et al. | |
| 2020/0056492 | A1* | 2/2020 | Shemyatovskiy | F01D 5/081 |

FOREIGN PATENT DOCUMENTS

| | | | |
|---|---|---|---|
| JP | 2008169838 | A1 | 7/2008 |
| KR | 101662351 | B1 | 12/2011 |
| KR | 0020415 | A1 | 2/2020 |
| KR | 102320481 | B1 | 11/2021 |

* cited by examiner

STRUCTURE FOR ASSEMBLING TURBINE BLADE SEALS AND GAS TURBINE INCLUDING THE SAME

CROSS-REFERENCE TO RELATED APPLICATION

This application claims priority to Korean Patent Application No. 10-2022-0019744, filed on Feb. 15, 2022, the disclosure of which is incorporated herein by reference in its entirety.

BACKGROUND

Technical Field

Exemplary embodiments relate to a structure for assembling turbine blade seals and a gas turbine including the same.

Related Art

Turbines are machines that obtain a rotational force by impingement or reaction force using the flow of a compressible fluid such as steam or gas. Examples of the turbines include a steam turbine using steam, a gas turbine using hot combustion gas, and so on.

Among them, the gas turbine largely includes a compressor, a combustor, and a turbine. The compressor has an air inlet for introduction of air thereinto, and includes a plurality of compressor vanes and compressor blades alternately arranged in a compressor casing.

The combustor supplies fuel to air compressed by the compressor and ignites a mixture thereof with a burner to produce high-temperature and high-pressure combustion gas.

The turbine includes a plurality of turbine vanes and turbine blades alternately arranged in a turbine casing. In addition, a rotor is disposed to pass through the centers of the compressor, the combustor, the turbine, and an exhaust chamber.

The rotor is rotatably supported at both ends thereof by bearings. The rotor has a plurality of disks fixed thereto, and blades are connected to each of the disks while a drive shaft of, e.g., a generator, is connected to the end of the exhaust chamber.

The gas turbine is advantageous in that consumption of lubricant is extremely low due to the absence of mutual friction parts such as a piston-cylinder since it does not have a reciprocating mechanism such as a piston in a four-stroke engine, the amplitude, which is a characteristic of reciprocating machines, is greatly reduced, and it enables high-speed motion.

The operation of the gas turbine is briefly described. The air compressed by the compressor is mixed with fuel so that the mixture thereof is burned to produce hot combustion gas, and the produced combustion gas is injected into the turbine. The injected combustion gas generates a rotational force while passing through the turbine vanes and turbine blades, thereby rotating the rotor.

A cooling channel for supplying cooling air from each turbine rotor disk to each turbine blade of that turbine rotor disk may be defined within the root of the turbine blade. In order to seal the cooling channel, seal plates may be coupled to both axial sides of the root of the turbine blade and the rotor disk so as to be pressed thereagainst.

Conventionally, the seal plates are fixedly fastened to the root of the turbine blade by bolts or the like. However, the heads of the bolts protrude from the seal plates, resulting in a windage loss due to friction with gas during high-speed rotation. In addition, the weight of each bolt generates a large centrifugal force when the bolt is fastened to the root of the turbine blade, which may cause an increase in stress on the root of the turbine blade.

SUMMARY

Aspects of one or more exemplary embodiments provide a structure for assembling turbine blade seals, which is capable of reducing a windage loss due to gas friction by removing a portion of a fixing member protruding from a seal plate and a turbine rotor disk, wherein the fixing member serves to fix a lower end of the seal plate to the turbine rotor disk, of improving structural stability of a turbine blade by minimizing a load applied to a root of the turbine blade, of minimizing stress concentration on the turbine rotor disk and the seal plate, and of allowing easy assembly, and a gas turbine including the same.

Additional aspects will be set forth in part in the description which follows and, in part, will become apparent from the description, or may be learned by practice of the exemplary embodiments.

According to an aspect of an exemplary embodiment, there is provided a structure for assembling turbine blade seals, which includes a turbine blade including an airfoil, a platform, and a root, a turbine rotor disk to which the root of the turbine blade is mounted, a seal plate mounted between the platform and one side of the turbine rotor disk to seal a cooling channel defined within the root and the platform, and an insertion pin inserted through the turbine rotor disk to fix the seal plate to the turbine rotor disk by supporting the seal plate, wherein the turbine rotor disk has a mounting groove into which a radially inner end of the seal plate is inserted, and the seal plate has a jaw portion radially supported by a stepped portion of the mounting groove.

The turbine rotor disk may include a mounting rib extending radially from one axial side thereof to form the mounting groove between the turbine rotor disk and the mounting rib, and a through-hole formed through the mounting rib to permit insertion of the insertion pin.

The seal plate may include a pin groove formed at the radially inner end thereof corresponding to the through-hole of the mounting rib.

The pin groove may be in the form of a semicircle.

The seal plate may gradually decrease in thickness toward the radially inner end thereof from the jaw portion to form an inclined surface.

The seal plate may further include an arc groove formed to prevent stress concentration on an inner corner between the jaw portion and a body plate, and a chamfer formed at the other corner of the jaw portion.

The turbine rotor disk may further include an arc groove formed at a concave corner of the mounting groove stepped portion, and a chamfer formed at a convex corner of the mounting groove stepped portion.

The insertion pin may include a cylindrical body, and a head integrally formed on one side of the body to have a larger outer diameter than the body.

The structure may further include a retainer inserted into the through-hole of the mounting rib together with the insertion pin to fix the insertion pin and prevent it from falling out.

The seal plate may further include an arc groove formed to prevent stress concentration on an inner corner between the jaw portion and a body plate, and a chamfer formed at the other corner of the jaw portion.

The turbine rotor disk may further include an arc groove formed at a concave corner of the mounting groove stepped portion, and a chamfer formed at a convex corner of the mounting groove stepped portion.

The insertion pin may include a cylindrical body, a head integrally formed at one side of the body to have a larger outer diameter than the body, and a cutout formed on the bottom of the body and the head so that the retainer is pressed against the cutout.

The insertion pin may further include a groove formed on the head, the groove being stepped from the cutout while extending thereto, the retainer being pressed against the groove.

The turbine rotor disk may include a head receiving hole formed on one side of the through-hole thereof and having a larger inner diameter than the through-hole, so that the head of the insertion pin is received in the head receiving hole.

The retainer may be formed by bending a rectangular plate, and may include a horizontal portion that is bendable by plastic deformation, a stepped portion connected from the horizontal portion in a stepped manner, and a vertical portion bent vertically from the stepped portion.

The head of the insertion pin may be supported by a bent portion formed by bending a portion of the horizontal portion after the retainer is inserted into the through-hole of the mounting rib and the insertion pin is then inserted into the through-hole.

The bent portion may be bent and then disposed inside the head receiving hole.

According to an aspect of another exemplary embodiment, there is provided a gas turbine that includes a compressor configured to suck and compress outside air, a combustor configured to mix fuel with the air compressed by the compressor to burn a mixture thereof, and a turbine rotating by combustion gas discharged from the combustor. The turbine includes a turbine blade including an airfoil, a platform, and a root, a turbine rotor disk to which the root of the turbine blade is mounted, a seal plate mounted between the platform and one side of the turbine rotor disk to seal a cooling channel defined within the root and the platform, and an insertion pin inserted through the turbine rotor disk to fix the seal plate to the turbine rotor disk by supporting the seal plate. The turbine rotor disk has a mounting groove into which a radially inner end of the seal plate is inserted, and the seal plate has a jaw portion radially supported by a stepped portion of the mounting groove.

The turbine rotor disk may include a mounting rib extending radially from one axial side thereof to form the mounting groove between the turbine rotor disk and the mounting rib, and a through-hole formed through the mounting rib to permit insertion of the insertion pin. The seal plate may include a pin groove formed at the radially inner end thereof corresponding to the through-hole of the mounting rib.

The seal plate may further include an arc groove formed to prevent stress concentration on an inner corner between the jaw portion and a body plate, and a chamfer formed at the other corner of the jaw portion. The turbine rotor disk may further include an arc groove formed at a concave corner of the mounting groove stepped portion, and a chamfer formed at a convex corner of the mounting groove stepped portion.

It is to be understood that both the foregoing general description and the following detailed description of exemplary embodiments are exemplary and explanatory and are intended to provide further explanation of the disclosure as claimed.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
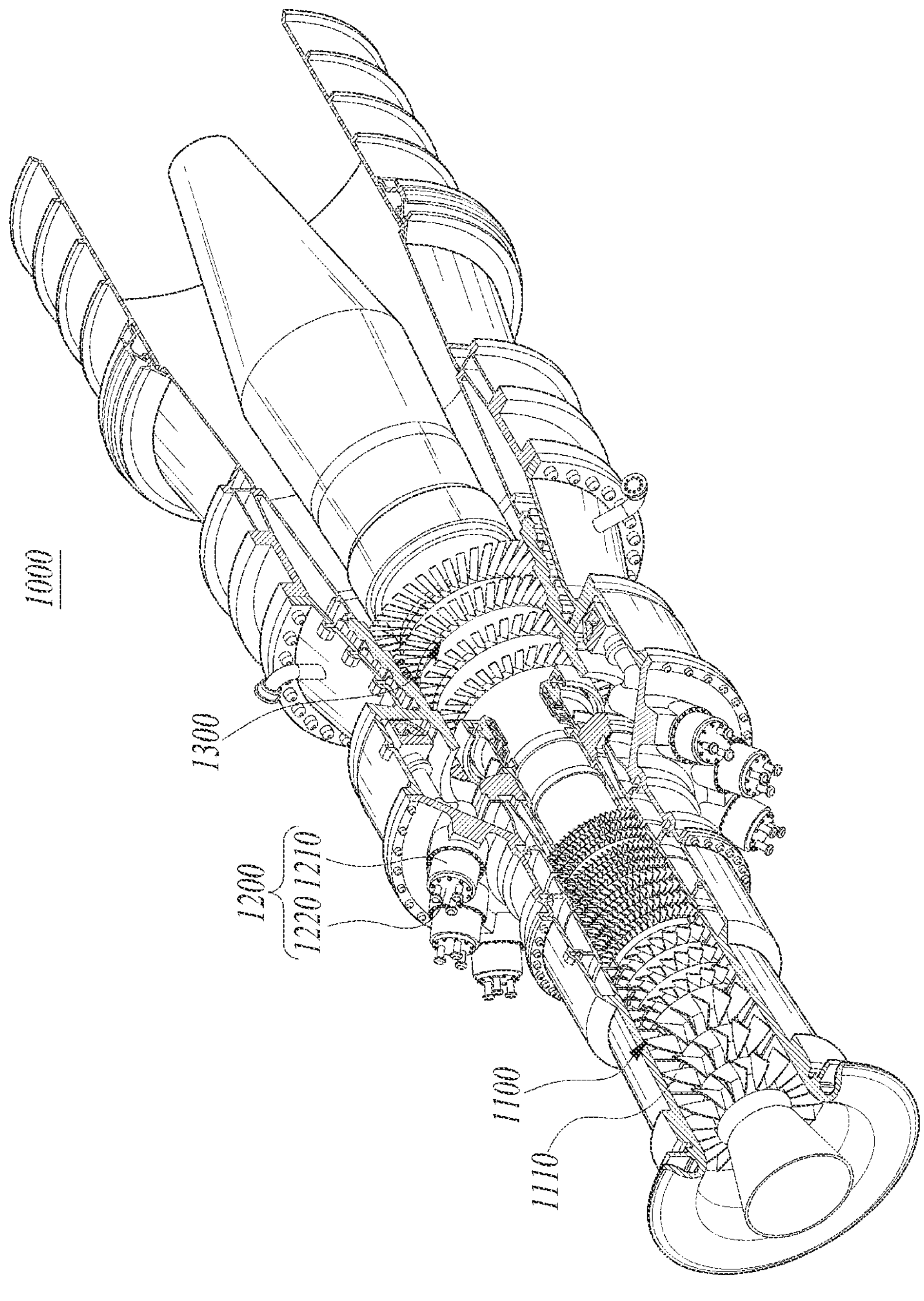
FIG. 1 is a partial cutaway perspective view illustrating a gas turbine according to an embodiment disclosed herein.

Various modifications and different embodiments will be described below in detail with reference to the accompanying drawings so that those skilled in the art can easily carry out the disclosure. It should be understood, however, that the present disclosure is not intended to be limited to the specific embodiments, but the present disclosure includes all modifications, equivalents or replacements that fall within the spirit and scope of the disclosure as defined in the following claims.

The terminology used herein is for the purpose of describing specific embodiments only and is not intended to limit the scope of the disclosure. As used herein, the singular forms "a", "an" and "the" are intended to include the plural forms as well, unless the context clearly indicates otherwise. In the disclosure, terms such as "comprises", "includes", or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

Embodiments will be described below in detail with reference to the accompanying drawings. It should be noted that like reference numerals refer to like parts throughout various drawings and embodiments. In certain embodiments, a detailed description of functions and configurations well known in the art may be omitted to avoid obscuring appreciation of the disclosure by those skilled in the art. For the same reason, some components may be exaggerated, omitted, or schematically illustrated in the accompanying drawings.

Figure 2:
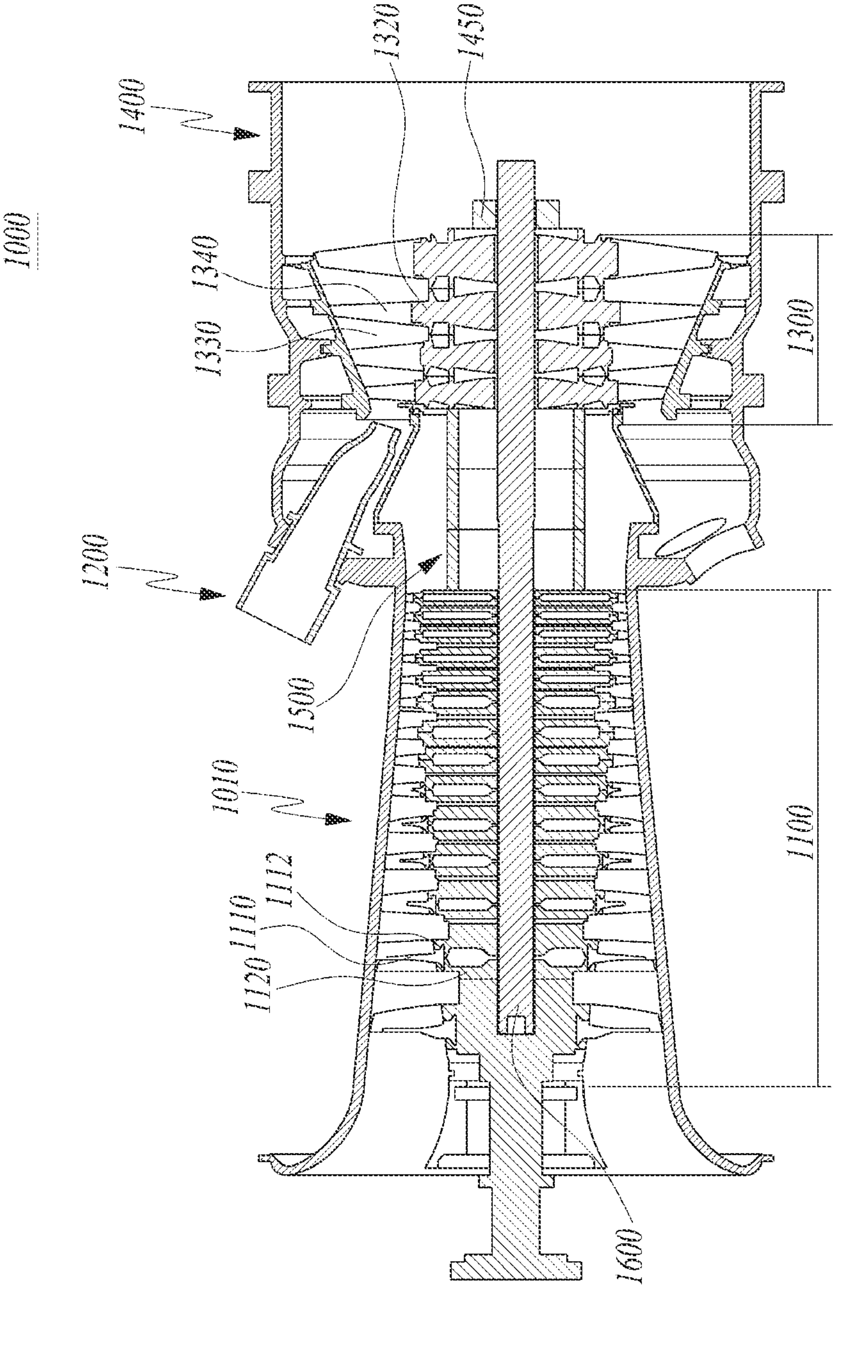
FIG. 2 is a cross-sectional view illustrating a schematic structure of the gas turbine according to the embodiment disclosed herein.
Figure 3:
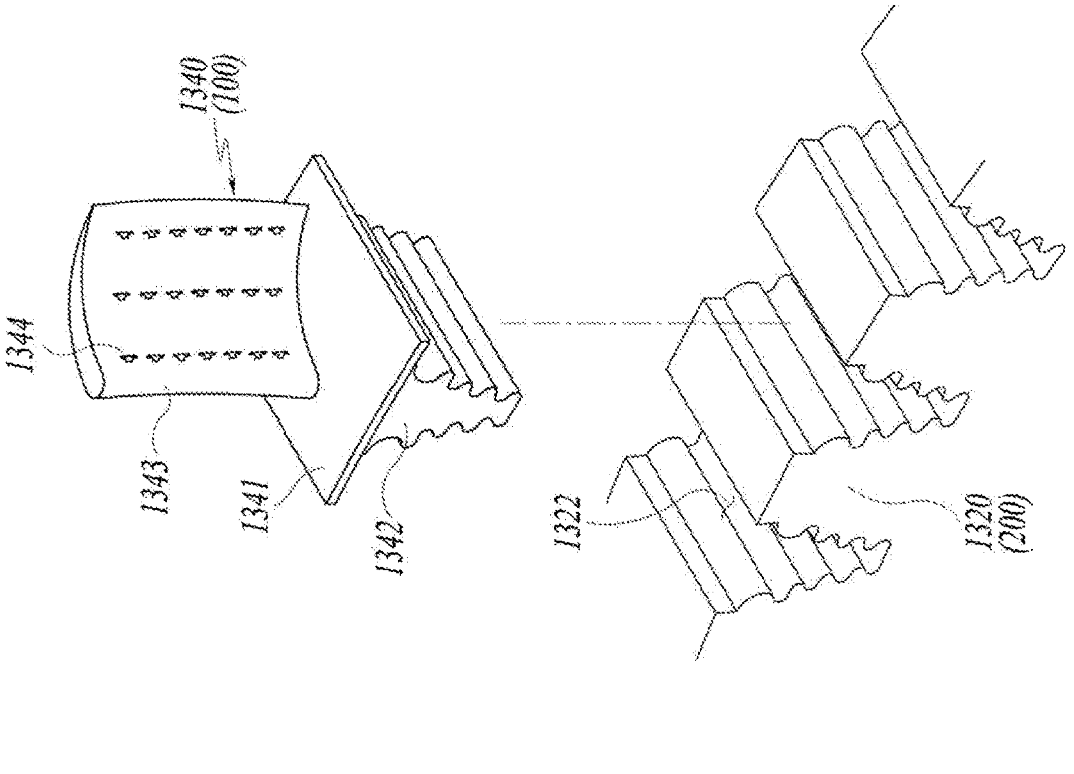
FIG. 3 is an exploded perspective view illustrating one of the turbine rotor disks of FIG. 2.

FIG. 1 is a partial cutaway perspective view illustrating a gas turbine according to an embodiment. FIG. 2 is a cross-sectional view illustrating a schematic structure of the gas turbine according to the embodiment. FIG. 3 is an exploded perspective view illustrating one of the turbine rotor disks of FIG. 2.

As illustrated in FIG. 1, the gas turbine, which is designated by reference numeral 1000, according to the embodiment includes a compressor 1100, a combustor 1200, and a turbine 1300. The compressor 1100 includes a plurality of blades 1110 arranged radially. The compressor 1100 rotates the blades 1110 so that air is compressed and flows by the rotation of the blades 1110. The sizes and installation angles of the blades 1110 may vary depending on the installation positions of the blades 1110. In an embodiment, the compressor 1100 may be directly or indirectly connected to the turbine 1300 to receive some of the power generated by the turbine 1300 and use the received power to rotate the blades 1110.

The air compressed by the compressor 1100 flows to the combustor 1200.

The combustor 1200 includes a plurality of combustion chambers 1210 and fuel nozzle modules 1220 arranged annularly.

As illustrated in FIG. 2, the gas turbine 1000 according to the exemplary embodiment includes a housing 1010 and a diffuser 1400 disposed behind the housing 1010 to discharge therefrom the combustion gas that has passed through the turbine 1300. The combustor 1200 is disposed in front of the diffuser 1400 and is supplied with the compressed air for combustion.

On the basis of the direction of flow of air, the compressor 1100 is disposed upstream of the combustor 1200, and the turbine 1300 is disposed downstream thereof. Between the compressor 1100 and the turbine 1300, a torque tube 1500 is disposed as a torque transmission member for transmitting, to the compressor 1100, the rotational torque generated in the turbine 1300.

The compressor 1100 includes a plurality of compressor rotor disks 1120 (e.g., 14 disks) individually fastened by a tie rod 1600 so as not to be axially separated from each other.

Specifically, the compressor rotor disks 1120 are axially aligned in a state in which the tie rod 1600 forming a rotary shaft passes through the substantial centers of the individual compressor rotor disks 1120. Here, the compressor rotor disks 1120 are arranged so as not to be rotatable relative to each other in such a manner that the facing surfaces of adjacent individual compressor rotor disks 1120 are pressed by the tie rod 1600.

Each of the compressor rotor disks 1120 has a plurality of blades 1110 radially coupled on the outer peripheral surface thereof. Each of the blades 1110 has a dovetail 1112 fastened to the compressor rotor disk 1120.

Vanes (not shown) are fixed in a compressor casing and arranged between the individual compressor rotor disks 1120 therein. The vanes are fixed so as not to rotate, unlike the compressor rotor disks, and serve to align a flow of compressed air that has passed through the blades of a compressor rotor disk to guide the aligned flow of air to the blades of a compressor rotor disk positioned downstream therefrom.

The dovetail 1112 may be fastened in a tangential type or axial type, which may be selected according to the structure required for the gas turbine used. This type may have a commonly known dovetail or fir-tree shape. In some cases, the blades may be fastened to the compressor rotor disk using a fastener, for example a fixture such as a key or a bolt, other than the above fastening type.

The tie rod 1600 is disposed to pass through the centers of the plurality of compressor rotor disks 1120 and turbine rotor disks 1320. The tie rod 1600 may be a single tie rod or consist of a plurality of tie rods. One end of the tie rod 1600 is fastened to a most upstream compressor rotor disk, and the other end thereof is fastened by a fixing nut 1450.

The tie rod 1600 may have various shapes depending on the structure of the gas turbine, and is therefore not necessarily limited to that illustrated in FIG. 2. That is, as illustrated in the drawings, one tie rod may be disposed to pass through the centers of the rotor disks, a plurality of tie rods may be arranged circumferentially, or a combination thereof may be used.

Although not illustrated in the drawings, in order to increase the pressure of fluid in the compressor of the gas turbine and then adapt the angle of flow of the fluid, entering the inlet of the combustor, to a design angle of flow, a deswirler serving as a guide vane may be installed next to the diffuser.

The combustor 1200 mixes fuel with the compressed air introduced thereinto and burns a mixture thereof to produce high-temperature and high-pressure combustion gas with high energy. The combustor 1200 may increase the temperature of the combustion gas to a heat-resistant limit of combustor and turbine components through an isobaric combustion process.

The combustion system of the gas turbine may include a plurality of combustors arranged in the housing in the form of a shell. Each of the combustors may include a burner having a fuel injection nozzle and the like, a combustor liner defining a combustion chamber, and a transition piece serving as the connection between the combustor and the turbine.

Specifically, the liner provides a combustion space in which, for combustion, the fuel injected by the fuel injection nozzle is mixed with the compressed air from the compressor. The liner may include a flame container providing the combustion space in which the mixture of air and fuel is burned, and a flow sleeve defining an annular space while surrounding the flame container. The fuel injection nozzle is coupled to the front end of the liner, and an ignition plug is coupled to the side wall of the liner.

The transition piece is connected to the rear end of the liner to transfer, toward the turbine, the combustion gas burned by the ignition plug. The outer wall of the transition piece is cooled by the compressed air supplied from the compressor to prevent the transition piece from being damaged due to the high temperature of the combustion gas.

To this end, the transition piece has holes for cooling formed to inject air thereinto, and the compressed air cools the body in the transition piece through the holes and then flows toward the liner.

The cooling air used to cool the transition piece may flow in the annular space of the liner, and the compressed air may impinge on the cooling air supplied through cooling holes, formed in the flow sleeve, from the outside of the flow sleeve on the outer wall of the liner.

The high-temperature and high-pressure combustion gas coming out of the combustor is supplied to the turbine 1300. The supplied high-temperature and high-pressure combustion gas impinges on the blades of the turbine and applies reaction force thereto while expanding, resulting in rotational torque. The obtained rotational torque is transmitted via the torque tube to the compressor, and power exceeding the power required to drive the compressor is used to drive a generator or the like.

The turbine 1300 basically has a structure similar to the compressor. That is, the turbine 1300 also includes a plurality of turbine rotor disks 1320 similar to the compressor rotor disks of the compressor. Accordingly, each of the turbine rotor disks 1320 also includes a plurality of turbine blades 1340 arranged radially. The turbine blades 1340 may also be coupled to the turbine rotor disk 1320 in a dovetail manner or the like. In addition, a plurality of turbine vanes 1330 fixed in a turbine casing are provided between the individual turbine blades 1340 of the turbine rotor disk 1320 to guide the direction of flow of the combustion gas that has passed through the turbine blades 1340.

Referring to FIG. 3, each of the turbine rotor disks 1320 has a substantially disk shape, and includes a plurality of coupling slots 1322 formed on the outer peripheral portion thereof. Each of the coupling slots 1322 may have a curved surface in the form of a fir-tree.

Each of the turbine blades 1340 is fastened to an associated one of the coupling slots 1322. In FIG. 3, the turbine blade 1340 includes a flat platform 1341 formed at the substantial center thereof. The side of the platform 1341 is in contact with the side of the platform 1341 of an adjacent turbine blade, which serves to maintain the distance between the blades.

A root 1342 is formed on the bottom of the platform 1341. The root 1342 is of an axial-type structure in which it is inserted into the coupling slot 1322 of the turbine rotor disk 1320 in the axial direction of the turbine rotor disk 1320.

The root 1342 has a curved portion in the form of a substantially fir-tree, which corresponds to the curved portion formed in the coupling slot. Here, the coupling structure of the root does not necessarily have to be in the fir-tree form, and may also be in the form of a dovetail.

An airfoil 1343 is formed on the top of the platform 1341. The airfoil 1343 may be formed to have an optimized airfoil shape according to the specification of the gas turbine. On the basis of the direction of flow of combustion gas, the airfoil 1343 has a leading edge disposed upstream and a trailing edge disposed downstream.

Meanwhile, unlike the blades of the compressor, the blades of the turbine come into direct contact with high-temperature and high-pressure combustion gas. Since the temperature of the combustion gas is as high as 1700° C., the turbine requires a cooling device. To this end, the turbine has a cooling passage for supplying the compressed air, which is bled from some portions of the compressor, to each blade of the turbine.

The cooling passage may extend from the outside of the turbine casing (external passage) or may extend through the inside of the turbine rotor disk (internal passage). Alternatively, both of the external passage and the internal passage may be used as the cooling passage. In FIG. 3, the airfoil has a plurality of film cooling holes 1344 formed on the surface thereof. The film cooling holes 1344 communicate with a cooling channel (not shown) defined within the airfoil 1343 and serve to supply the cooling air to the surface of the airfoil 1343.

Meanwhile, the blades 1340 of the turbine are rotated by combustion gas in the turbine casing. There is a clearance between the tip of each of the turbine blades 1340 and the inner surface of the turbine casing such that the turbine blade is smoothly rotatable. However, since the combustion gas may leak through the clearance as described above, a sealing device for blocking the leakage of the combustion gas is preferred.

Each of the turbine vanes and the turbine blades has an airfoil shape, and includes a leading edge, a trailing edge, a suction side, and a pressure side. The turbine vane and the turbine blade each have a complicated labyrinth structure therein that forms a cooling system. A cooling circuit in each of the turbine vane and the turbine blade receives a cooling fluid, e.g., air from the compressor of the gas turbine, so that the fluid passes through the end of the turbine vane or turbine blade, which is coupled to a turbine vane or turbine blade carrier. The cooling circuit typically includes a plurality of flow paths designed to maintain all surfaces of the turbine vane or blade at a relatively uniform temperature, and at least a portion of the fluid that has passed through the cooling circuit is discharged through the openings of the leading edge, trailing edge, suction side, and pressure side of the turbine vane or blade.

Figure 4:
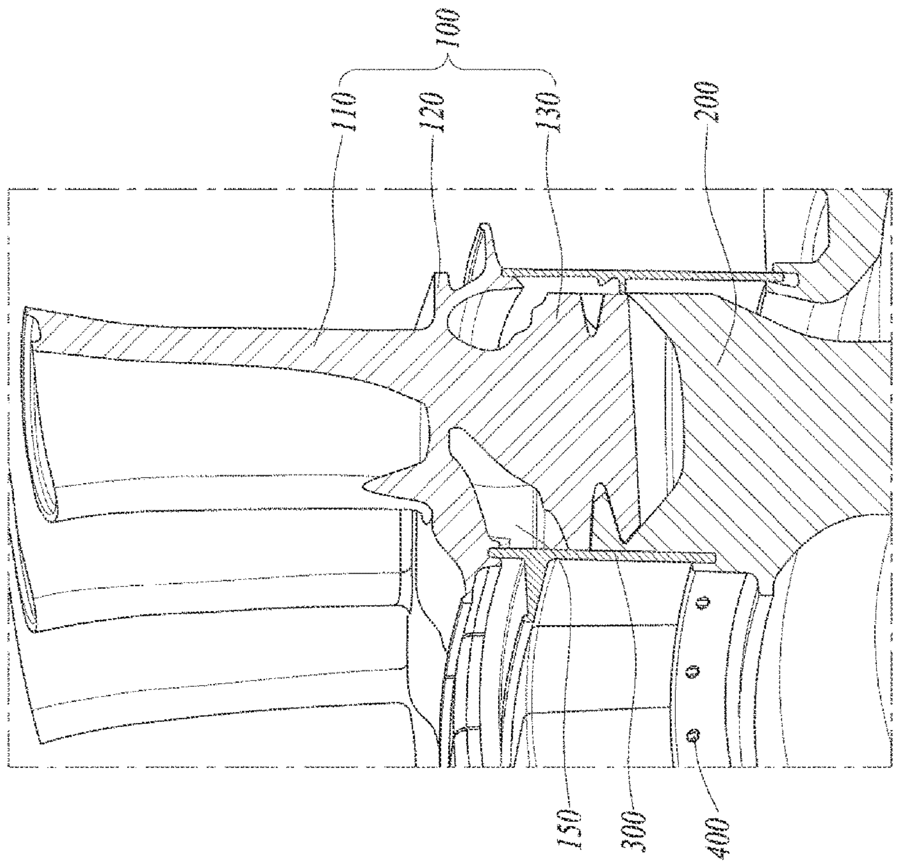
FIG. 4 is a partial cutaway perspective view illustrating a structure for assembling turbine blade seals according to an embodiment disclosed herein.
Figure 5A:
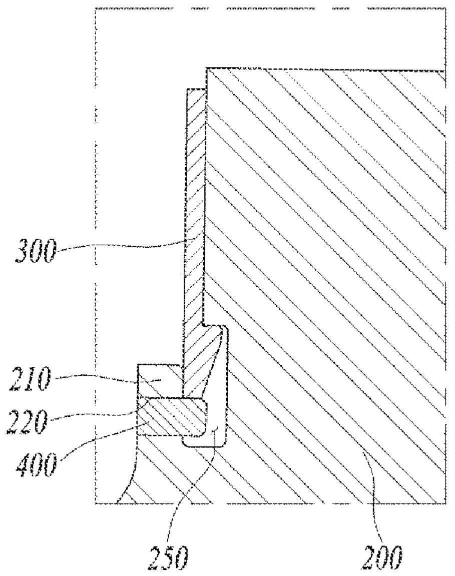
FIG. 5A is a partial cross-sectional view illustrating a structure for assembling turbine blade seals according to an embodiment disclosed herein.
Figure 5B:
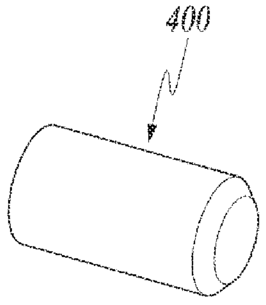
FIG. 5B is a perspective view illustrating an insertion pin according to an embodiment disclosed herein.
Figure 5C:
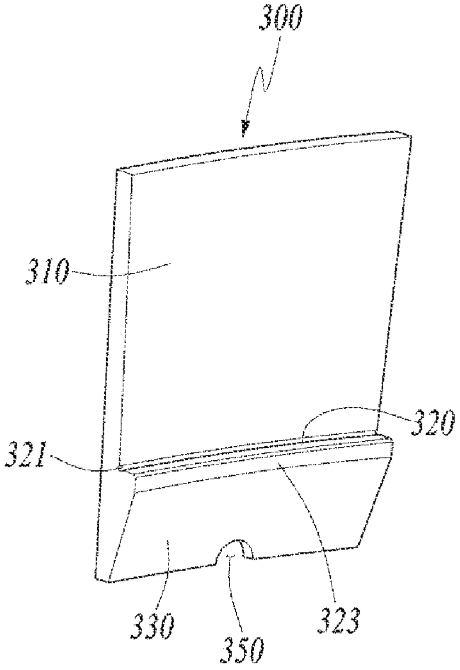
FIG. 5C is a perspective view illustrating a seal plate according to an embodiment disclosed herein.
Figure 6:
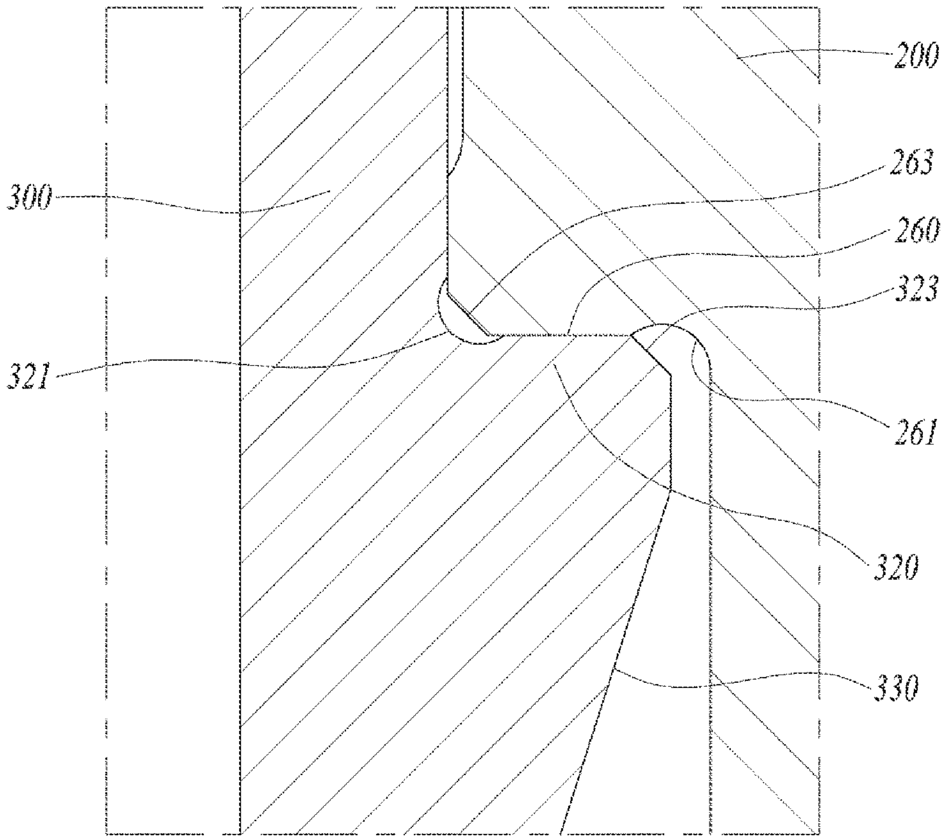
FIG. 6 is an enlarged partial cross-sectional view illustrating a region around a jaw portion in FIG. 5A.

FIG. 4 is a partial cutaway perspective view illustrating a structure for assembling turbine blade seals according to an exemplary embodiment. FIG. 5A is a partial cross-sectional view illustrating a structure for assembling turbine blade seals according to a first exemplary embodiment, FIG. 5B is a perspective view illustrating an insertion pin, and FIG. 5C is a perspective view illustrating a seal plate. FIG. 6 is an enlarged partial cross-sectional view illustrating a region around a jaw portion in FIG. 5A.

The structure for assembling turbine blade seals according to the exemplary embodiment includes a turbine blade 100 (or also designated by reference numeral 1340) having an airfoil 110 (or also designated by reference numeral 1343), a platform 120 (or also designated by reference numeral 1341), and a root 130 (or also designated by reference numeral 1342), a turbine rotor disk 200 (or also designated by reference numeral 1320) to which the root of the turbine blade is mounted, a seal plate 300 mounted between the platform and one side of the turbine rotor disk 200 to seal a cooling channel 150 defined within the root 130 and the platform 120, and an insertion pin 400 inserted through the turbine rotor disk 200 to fix the seal plate 300 to the turbine rotor disk 200 by supporting the seal plate 300.

As illustrated in FIGS. 3 and 4, the airfoil 110 of the turbine blade 100 is composed of a leading edge, a trailing edge, a convex suction side on one side thereof, and a concave pressure side on the other side thereof, as described above.

The platform 120 having a substantially flat shape may be integrally formed on the radially inner side of the airfoil 110. The platform 120 may have a circumferential width greater than the thickness of the airfoil 110.

The root 130 may extend radially inward from the platform 120 and be formed integrally therewith. The root 130 may have a curved surface in the form of a fir-tree shape. As illustrated in FIG. 3, the root 130 (1342) may be inserted and mounted in each coupling slot 1322 of the turbine rotor disk 200 (1320) having a curved surface in the form of a fir-tree corresponding thereto.

The turbine rotor disk 200 may have a circular disk shape as a whole. The turbine rotor disk 200 may include a through-hole formed at the center thereof to permit passage of the tie rod 1600, and a plurality of coupling slots 1322 arranged at regular intervals on the outer peripheral surface thereof. The root 130 of the turbine blade 100 may be inserted and mounted in each of the coupling slots 1322.

In the embodiment of FIG. 4, the root 130 of the turbine blade 100 may be circumferentially inserted and mounted in the coupling slot of the turbine rotor disk 200. That is, the turbine blade of FIG. 3 may be mounted to the turbine rotor disk 1320 with an axial type arrangement, whereas the turbine blade of FIG. 4 may be mounted to the turbine rotor disk 200 with a tangential type arrangement.

The cooling channel 150 may be defined within the root 130 and the platform 120 to supply cooling air to the turbine blade 100. The seal plate 300 may be mounted between the platform 120 and one side of the turbine rotor disk 200 to seal the cooling channel 150.

As illustrated in FIGS. 5A to 5C, the insertion pin 400 may be inserted into the through hole formed in the turbine rotor disk 200 to fix the seal plate 300 to the turbine rotor disk 200 by radially supporting the seal plate 300.

The turbine rotor disk 200 may have a mounting groove 250 into which the radially inner end of the seal plate 300 is inserted. The turbine rotor disk 200 may include a mounting rib 210 extending radially from one axial side thereof to form the mounting groove 250 between the turbine rotor disk 200 and the mounting rib 210. As illustrated in FIG. 5A, the mounting groove 250 may have a substantially rectangular shape in cross-section.

As illustrated in FIG. 5A, the mounting rib 210 may have a through-hole 220 formed axially therethrough so that the insertion pin 400 is inserted into the through-hole 220. The through-hole 220 may be a circular hole formed in the thickness direction of the mounting rib 210.

As illustrated in FIG. 5B, the insertion pin 400 may be in the form of a cylinder having a chamfer formed at one corner thereof.

As illustrated in FIG. 5C, the seal plate 300 may include a pin groove 350 formed at the radially inner end thereof corresponding to the through-hole 220 of the mounting rib 210. The pin groove 350 may be in the form of a semicircle at the widthwise center of the radially inner end of the seal plate 300. Thus, the insertion pin 400 may be inserted, by about half of its thickness, into the pin groove 350 to support the seal plate 300.

The seal plate 300 may gradually decrease in thickness toward the radially inner end thereof from a jaw portion 320 to form an inclined surface 330. Referring to FIG. 5C, the inclined surface 330 may have a lower end formed to have a thickness smaller than that of the body plate 310 on the jaw portion 320 of the seal plate 300. The inclined surface 330 does not start directly from the jaw portion 320, but may be connected from the lower end of the vertical place thereof at a predetermined height. The structure of the seal plate 300 may allow the lower portion of the seal plate 300 to be easily tilted and inserted into the mounting groove 250 without interference.

As illustrated in FIGS. 5C and 6, the seal plate 300 may further include an arc groove 321 formed to prevent stress concentration on an inner corner between the jaw portion 320 and the body plate 310, and a chamfer 323 formed at the other corner of the jaw portion 320.

The arc groove 321 may be a groove having a predetermined radius of curvature, which is formed at an inner corner between the upper surface of the jaw portion 320 and the side surface of the body plate 310. That is, by forming the arc groove 321 at the inner corner where the two planes meet vertically, it is possible to prevent stress concentration on that corner.

The chamfer 323 may be formed at an angle of 40 to 50 degrees at an outer corner where the upper surface of the jaw portion 320 and the inclined surface 330 meet. The chamfer 323 can prevent stress concentration on that corner and reduce damage caused by colliding with other components when assembling or disassembling the seal plate 300.

As illustrated in FIG. 6, the turbine rotor disk 200 may further include an arc groove 261 formed at the concave corner of the stepped portion 260 of the mounting groove 250, and a chamfer formed at the convex corner of the mounting groove stepped portion 260.

Referring to FIG. 6, the arc groove 261 may be a groove having a predetermined radius of curvature, which is formed at an inner corner where the vertical plane of the mounting groove 250 of the turbine rotor disk 200 and the horizontal plane of the stepped portion 260 meet. That is, by forming the arc groove 261 at the inner corner where the two planes meet vertically, it is possible to prevent stress concentration on that corner. In addition, the chamfer 323 of the seal plate 300 is located in front of the arc groove 261, which can minimize interference when the arc groove 261 allows the seal plate 300 to be tilted and inserted into the mounting groove 250.

The chamfer 263 may be formed at an angle of 40 to 50 degrees at the convex corner of the mounting groove stepped portion 260. The chamfer 263 not only can prevent stress concentration on that part but also can minimize interference during disassembly and assembly since the arc groove 321 of the seal plate 300 is located in front of the chamfer 263.

Figure 7B:
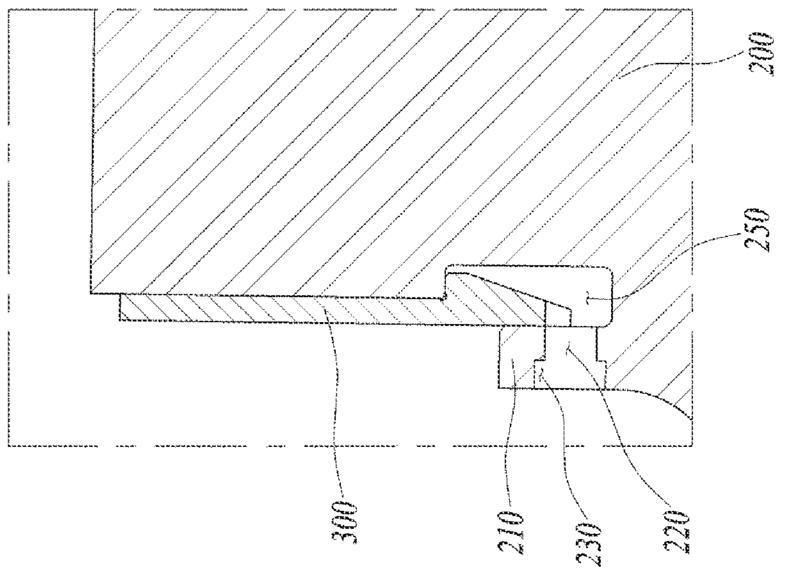
FIG. 7B is a cross-sectional view illustrating the structure of FIG. 7A excluding an insertion pin.
Figure 7A:
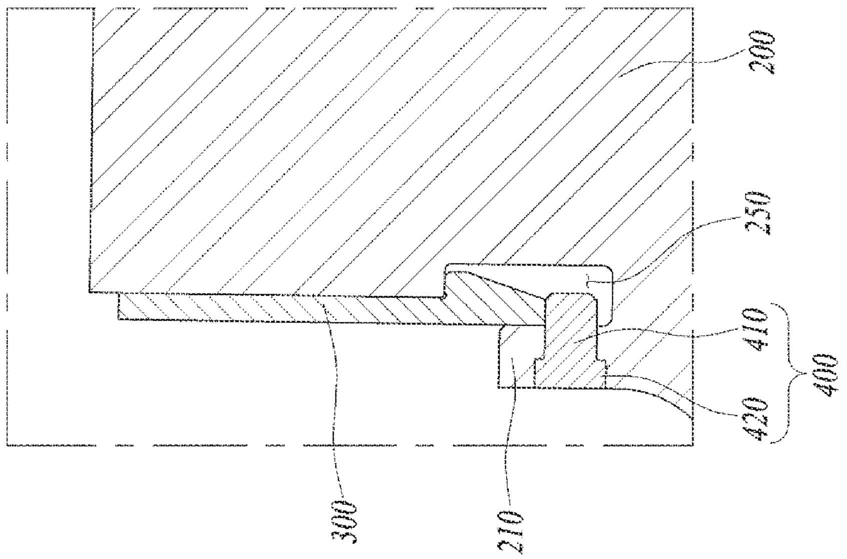
FIG. 7A is a cross-sectional view illustrating a structure for assembling turbine blade seals according to an embodiment disclosed herein.

FIG. 7A is a cross-sectional view illustrating a structure for assembling turbine blade seals according to a second embodiment, and FIG. 7B is a cross-sectional view illustrating the structure of FIG. 7A excluding an insertion pin.

As illustrated in FIG. 7A, in the structure for assembling turbine blade seals according to the second embodiment, the insertion pin, which is designated by reference numeral 400, includes a cylindrical body 410, and a head 420 integrally formed on one side of the body to have a larger outer diameter than the body.

That is, in the structure of the second embodiment, compared to the first exemplary embodiment, the insertion pin 400 further includes the head 420 as well as the cylindrical body 410. The head 420 may be in the form of a cylinder having a larger outer diameter than the body 410.

As illustrated in FIG. 7B, the through-hole 220 into which the insertion pin 400 is inserted may further has a head receiving hole 230 in which the head 420 is received, the head receiving hole 230 corresponding to the outer appearance of the insertion pin 400. The head receiving hole 230 may have an inner diameter slightly larger than the outer diameter of the head 420 of the insertion pin 400. In addition, the head receiving hole 230 may have a longitudinal depth slightly larger than the length of the head 420 of the insertion pin 400, thereby preventing the insertion pin 400 from protruding out of the through-hole 220 of the mounting rib 210. Since the head receiving hole 230 has a stepped longitudinal inner side, the insertion pin 400 may be mounted in an accurate position by limiting the insertion depth of the insertion pin 400 during insertion thereof.

Figure 9:
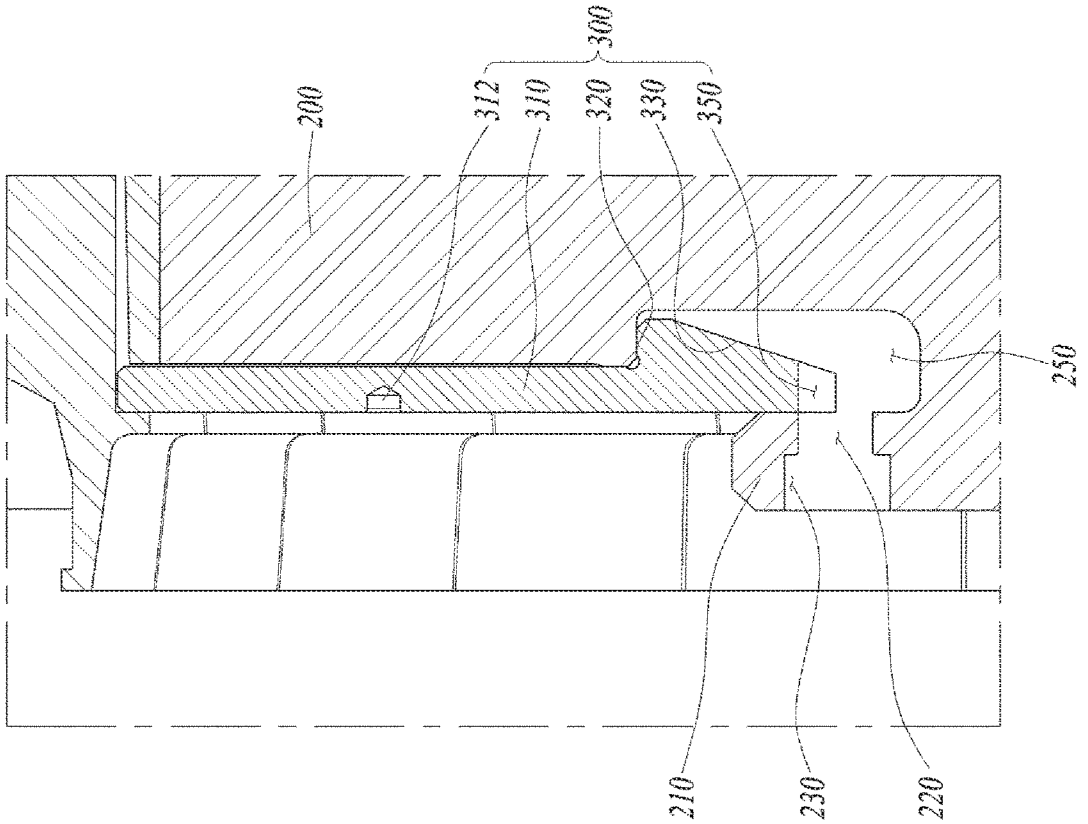
FIG. 9 is a partial cross-sectional view illustrating the structure of FIG. 8 with an insertion pin and a retainer omitted.
Figure 8:
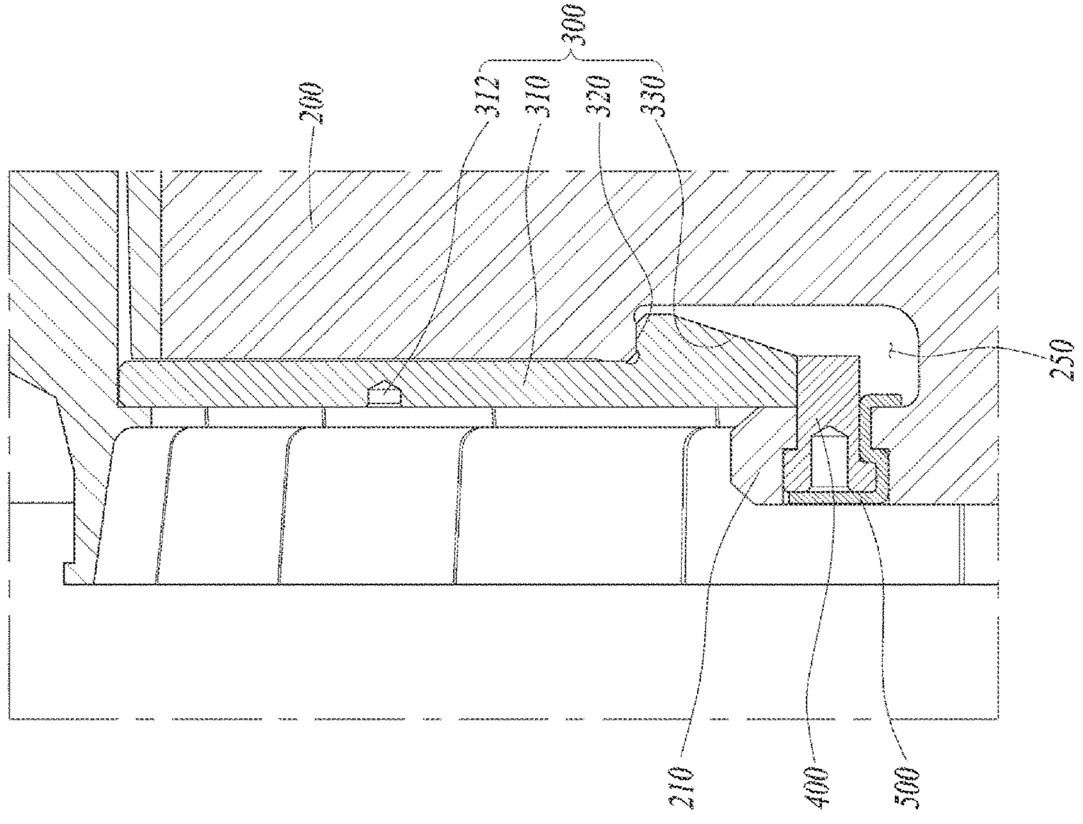
FIG. 8 is a cross-sectional view illustrating a structure for assembling turbine blade seals according to an embodiment disclosed herein.
Figure 10:
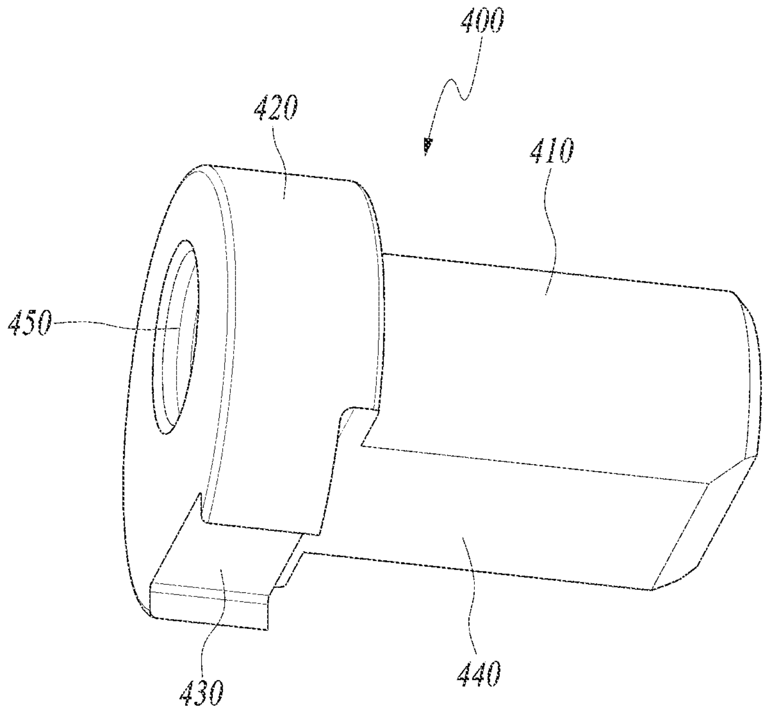
FIG. 10 is a perspective view illustrating the insertion pin according to an embodiment disclosed herein.
Figure 11:
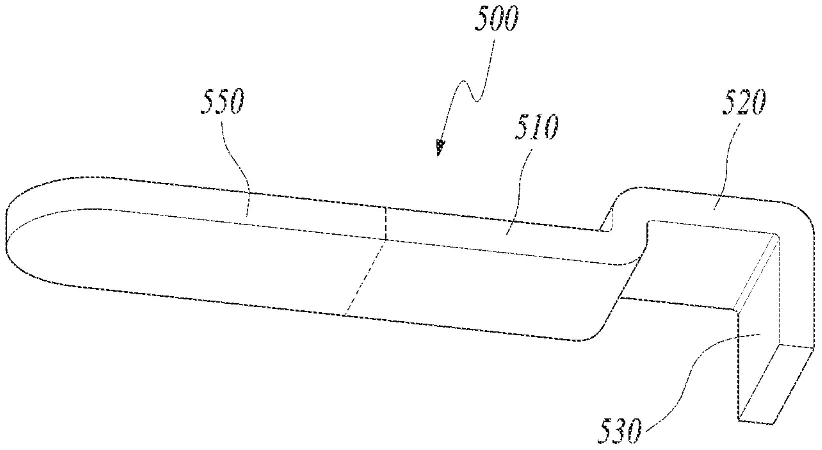
FIG. 11 is a perspective view illustrating the retainer according to an embodiment disclosed herein.

FIG. 8 is a cross-sectional view illustrating a structure for assembling turbine blade seals according to a third embodiment. FIG. 9 is a partial cross-sectional view illustrating the structure of FIG. 8 with an insertion pin and a retainer omitted. FIG. 10 is a perspective view illustrating the insertion pin. FIG. 11 is a perspective view illustrating the retainer.

Compared to the second embodiment, the structure for assembling turbine blade seals according to the third embodiment further includes a retainer 500 inserted into a through-hole 220 of a mounting rib 210 together with an insertion pin 400 to fix the insertion pin 400 and prevent it from falling out.

As in the above-mentioned embodiments, the turbine rotor disk 200 may include a mounting rib 210, a through-hole 220, and a mounting groove 250. In addition, the seal plate 300 may also have the same shape as that described in the above exemplary embodiment.

As illustrated in FIG. 9, the seal plate 300 may include a pin groove 350 formed at the radially inner end thereof corresponding to the through-hole 220 of the mounting rib 210.

As described above with reference to FIG. 6, the seal plate 300 may further include an arc groove 321 formed to prevent stress concentration on an inner corner between the jaw portion 320 and the body plate 310, and a chamfer 323 formed at the other corner of the jaw portion 320. The turbine rotor disk 200 may further include an arc groove 261 formed at the concave corner of the stepped portion 260 of the mounting groove 250, and a chamfer formed at the convex corner of the mounting groove stepped portion 260.

The insertion pin 400 may be inserted into the through-hole formed in the turbine rotor disk 200 to fix the seal plate 300 to the turbine rotor disk 200 by supporting the seal plate 300.

The insertion pin 400 may be simply inserted into the through-hole formed in the mounting rib 210 of the turbine rotor disk 200, and the retainer may be mounted in the through-hole of the turbine rotor disk 200 to fix the insertion pin 400 and prevent it from falling out.

As illustrated in FIG. 10, the insertion pin 400 may include a cylindrical body 410, a head 420 integrally formed at one side of the body to have a larger outer diameter than the body, and a cutout 440 formed on the bottom of the body and the head so that the retainer 500 is pressed against the cutout 440.

The body 410 may have a cylindrical shape, the head 420 may be in the form of a cylinder having a larger outer diameter than the body 410, and the body 410 and the head 420 may be formed integrally with each other in a stepped manner.

The cutout 440 against which the retainer 500 is pressed may be formed throughout the bottom of the body 410 and on a portion of the bottom of the head 420. The cutout 440 may have a flat cut surface, and the head 420 may have a stepped surface formed at the middle of the bottom thereof and perpendicular to the cut surface. In addition, the cutout 440 may have a chamfer formed in the vicinity of the end of the body 410.

The insertion pin 400 may further include a groove 430 formed on the head 420. The groove 430 is stepped from the cutout 440 while extending thereto, and the retainer 500 is pressed against the groove 430. The groove 430 may be shallower than the cutout 440 so as to be stepped from the cutout 440. The cutout 440 may have a flat surface extending to the circumferential surface of the insertion pin 400 in its width direction, whereas the groove 430 may have a bottom stepped from the circumferential surface of the head 420 since it has a width smaller than the outer diameter of the head 420.

The insertion pin 400 may have a screw hole 450 formed longitudinally from one side of the head 420. The screw hole 450 may be formed at a position slightly biased toward the opposite side of the groove 430 rather than at the center of the head 420. The screw hole 450 may have a depth larger than the length of the head 420. The screw hole 450 has a thread formed on the inner peripheral surface thereof. Accordingly, when it is intended to disassemble the insertion pin 400, the insertion pin 400 may be easily separated from the through-hole 220 by fastening a bolt to the screw hole 450 and pulling the bolt.

As illustrated in FIG. 9, the turbine rotor disk 200 may have a head receiving hole 230 formed on one side of the through-hole 220 thereof and having a larger inner diameter than the through-hole 220, so that the head 420 of the insertion pin 400 is received in the head receiving hole 230.

The head receiving hole 230 has a larger diameter than the through-hole 220 to be stepped from the through-hole 220, thereby enabling the head 420 of the insertion pin 400 to be received in position. The head receiving hole 230 may have a depth larger than the length of the head 420. Accordingly, a bent portion 550 may be entirely received in the head receiving hole 230 as will be described later.

As illustrated in FIG. 11, the retainer 500 may be formed by bending a rectangular plate, and may include a horizontal portion 510 that is bendable by plastic deformation, a stepped portion 520 connected from the horizontal portion in a stepped manner, and a vertical portion 530 bent vertically from the stepped portion.

The retainer 500 may be formed by bending a rectangular metal plate having a predetermined width, length, and thickness. The retainer 500 may be made of a material that is easily bendable in its entirety by plastic deformation, or may be made of a material in which only the horizontal portion 510 is bendable by plastic deformation after the insertion of the retainer 500.

The horizontal portion 510 may be an elongated rectangular plate, and as illustrated in FIG. 11, a non-bent portion of the horizontal portion 510 may be inserted into the groove 430 of the insertion pin 400.

The stepped portion 520 may be formed in such a manner that it is bent upward from one end of the horizontal portion 510 and then bent horizontally. As illustrated in FIG. 8, the stepped portion 520 may be mounted between the cutout 440 of the insertion pin 400 and the through-hole 220.

The vertical portion 530 may be formed in such a manner that it is bent downward from one end of the stepped portion 520. The vertical portion 530 may be twice or more longer than the height of the stepped portion 520. The vertical portion 530 may be pressed against the inner surface of the mounting rib 210 to fix the retainer 500 and prevent it from falling out.

As illustrated in FIG. 8, the head 420 of the insertion pin 400 may be supported by the bent portion 550 formed by bending a portion of the horizontal portion 510 after the retainer 500 is inserted into the through-hole 220 of the mounting rib 210 and the insertion pin 400 is then inserted into the through-hole 220.

In this case, since the bent portion 550 is bent and then disposed inside the head receiving hole 230, it is possible to prevent the retainer 500 and the head 420 of the insertion pin 400 from protruding from the outer surface of the through-hole 220 of the mounting rib 210.

As illustrated in FIG. 8, the seal plate 300 may have a screw hole 312 formed in the center of one surface thereof. The screw hole 312 may be formed to a depth of about half of the thickness of the seal plate 300 without penetrating the seal plate 300. The screw hole 312 has a thread formed on the inner peripheral surface thereof Accordingly, when it is intended to assemble the seal plate 300, the seal plate 300 may be easily moved to an accurate position by fastening a screw to the screw hole 312.

Figure 12:
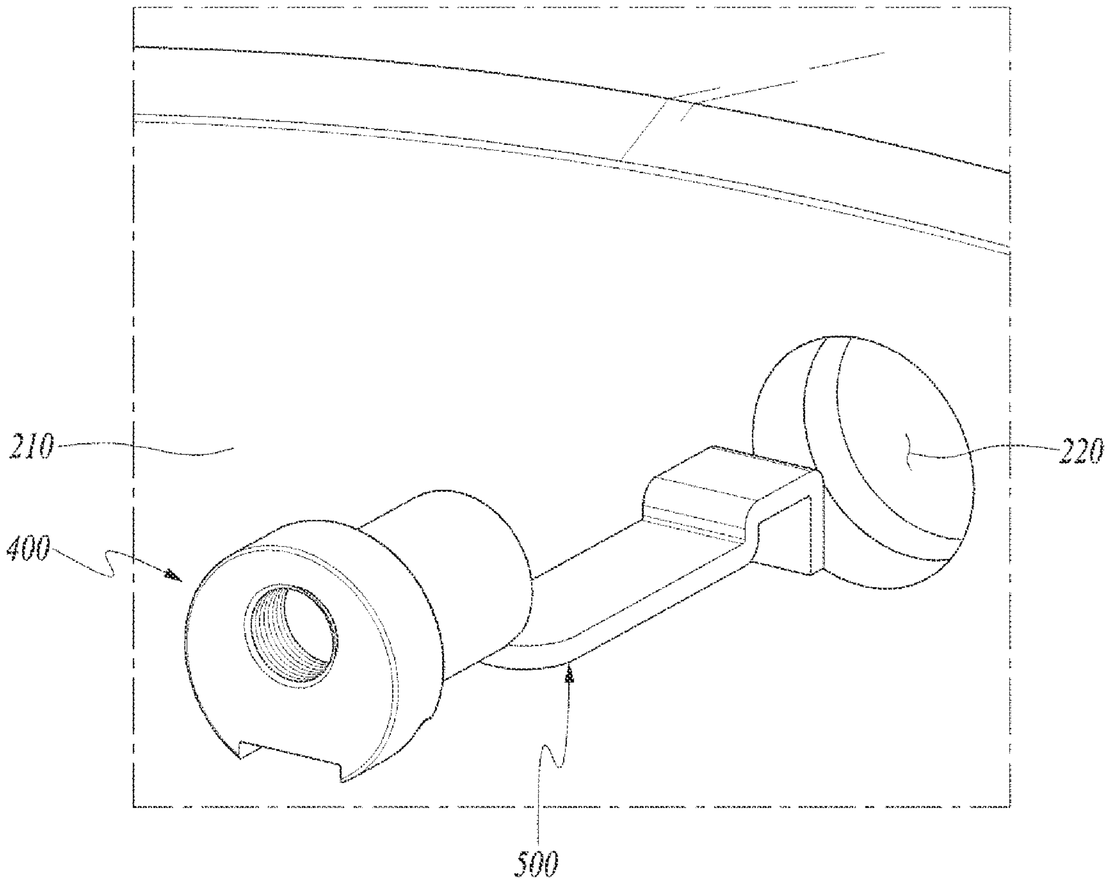
FIG. 12 is a perspective view illustrating a seal plate before the insertion pin and retainer are inserted to assemble the seal plate to the turbine rotor disk according to an embodiment disclosed herein.
Figure 13:
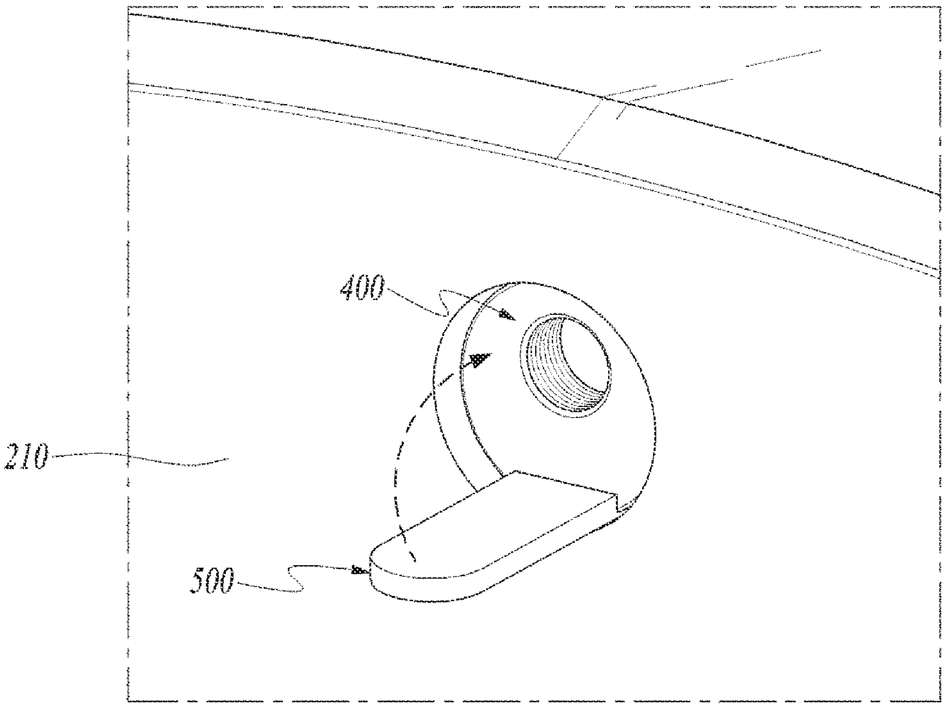
FIG. 13 is a perspective view illustrating the seal plate of FIG. 12 after the insertion pin and retainer are inserted, but before the retainer is bent, to assemble the seal plate to the turbine rotor disk according to an embodiment disclosed herein.
Figure 14:
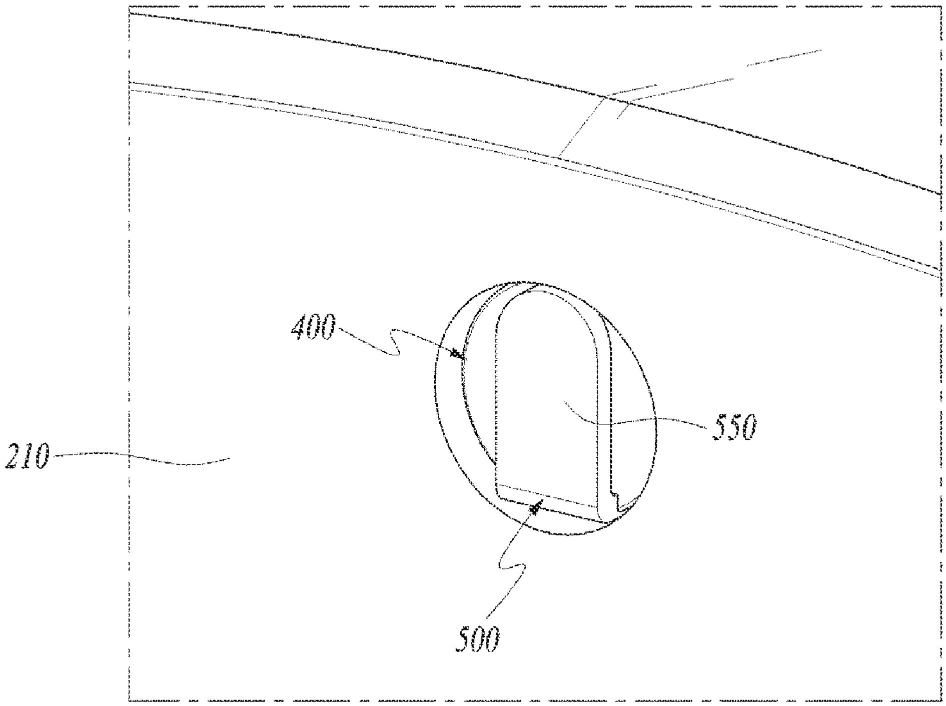
FIG. 14 is a perspective view illustrating the seal plate of FIG. 13 after the retainer is bent to assemble the seal plate to the turbine rotor disk according to an embodiment disclosed herein.

FIGS. 12 to 14 are perspective views illustrating a process of assembling the seal plate to the turbine rotor disk using the insertion pin and the retainer.

Hereinafter, a method of assembling turbine blade seals will be described with reference to the drawings.

First, as illustrated in FIG. 4, the root 130 of the turbine blade 100 is inserted and mounted in the slot of the turbine rotor disk 200.

Next, as illustrated in FIG. 9, the seal plate 300 is mounted between the platform 120 of the turbine blade 100 and the mounting rib 210 of the turbine rotor disk 200. In this case, the radially inner end of the seal plate 300 may be inserted into the mounting groove 250.

Next, as illustrated in FIG. 12, the retainer 500 is inserted and mounted in the through-hole 220 formed in the mounting rib 210. In this case, in the state in which the horizontal portion 510 of the retainer 500 is not bent, the stepped portion 520 and the vertical portion 530 may be inserted and mounted in the through-hole 220.

Next, as illustrated in FIGS. 12 and 13, the insertion pin 400 is inserted and mounted in the through-hole 220 of the mounting rib 210 and the pin groove 350 formed in the seal plate 300. In this case, the stepped portion between the body 410 and the head 420 of the insertion pin 400 may be inserted so as to be pressed against and supported by the stepped portion between the through-hole 220 and the head receiving hole 230. In addition, the insertion pin 400 may be inserted and mounted so that the stepped portion 520 and the horizontal portion 510 of the retainer 500 are in contact with the cutout 440 and the groove 430 of the insertion pin 400.

Next, as illustrated in FIG. 13, a portion of the retainer 500 protruding out of the mounting rib 210 is bent to support the insertion pin 400. That is, the bent portion 550 formed by bending the protruding end of the horizontal portion 510 of the retainer 500 vertically may be pressed against the head 420 of the insertion pin 400 to support the insertion pin 400.

As illustrated in FIG. 14, the bent portion 550 formed by bending a portion of the horizontal portion 510 may be disposed inside the through-hole 220 of the turbine rotor disk 200. That is, since the insertion pin 400 or the retainer 500 does not protrude from the outer surface of the mounting rib 210, it is possible to prevent a flow loss due to friction of the protruding portion with gas.

As is apparent from the above description, according to the structure for assembling turbine blade seals and the gas turbine including the same, it is possible to reduce a windage loss due to gas friction by removing a portion of the fixing member protruding from the seal plate and the turbine rotor disk, wherein the fixing member serves to fix the lower end of the seal plate to the turbine rotor disk, to improve the structural stability of the turbine blade by minimizing the load applied to the root of the turbine blade, to minimize stress concentration on the turbine rotor disk and the seal plate, and to allow easy assembly.

While one or more exemplary embodiments have been described with reference to the accompanying drawings, it will be apparent to those skilled in the art that various variations and modifications may be made by adding, changing, or removing components without departing from the spirit and scope of the disclosure as defined in the appended claims, and these variations and modifications fall within the spirit and scope of the disclosure as defined in the appended claims.

What is claimed is:

1. A structure for assembling turbine blade seals, comprising:
- a turbine blade comprising an airfoil, a platform, and a root;
- a turbine rotor disk to which the root of the turbine blade is mounted;
- a seal plate mounted between the platform and one side of the turbine rotor disk to seal a cooling channel defined within the root and the platform; and
- an insertion pin inserted axially through the turbine rotor disk to fix the seal plate to the turbine rotor disk by supporting the seal plate, wherein:
- the turbine rotor disk has a mounting groove into which a radially inner end of the seal plate is inserted,
- the seal plate has a jaw portion radially supported by a stepped portion of the mounting groove, the seal plate further comprising a body plate having a first side and an opposing second side,
- the turbine rotor disk comprises a mounting rib extending radially from one axial side thereof to form the mounting groove between the turbine rotor disk and the mounting rib, and
- a through-hole formed axially through the mounting rib to permit insertion of the insertion pin;
- the turbine rotor disk comprises a first vertical surface that abuts the first side of the seal plate;
- the mounting rib comprises a second vertical surface parallel to the first vertical surface that abuts the second side of the seal plate, and
- the seal plate is positioned entirely to one side of the second vertical surface.

2. The structure according to claim 1, wherein the seal plate comprises a pin groove formed at the radially inner end thereof corresponding to the through-hole of the mounting rib.

3. The structure according to claim 2, wherein the pin groove is in the form of a semicircle.

4. The structure according to claim 2, further comprising a retainer inserted into the through-hole of the mounting rib together with the insertion pin to fix the insertion pin and prevent the insertion pin from falling out.

5. The structure according to claim 4, wherein the seal plate gradually decreases in thickness toward the radially inner end thereof from the jaw portion to form an inclined surface, and the seal plate further comprises:
- an arc groove formed to prevent stress concentration on an inner corner between the jaw portion and a body plate; and a chamfer formed at an outer corner of the jaw portion where the stepped portion and the inclined surface meet.

6. The structure according to claim 5, wherein the turbine rotor disk further comprises:

an arc groove formed at a concave corner of the mounting groove stepped portion; and a chamfer formed at a convex corner of the mounting groove stepped portion.

7. The structure according to claim 4, wherein the insertion pin comprises:

a cylindrical body;

a head integrally formed at one side of the body to have a larger outer diameter than the body; and a cutout formed on the bottom of the body and the head so that the retainer is pressed against the cutout.

8. The structure according to claim 7, wherein the insertion pin further comprises a groove formed on the head, the groove being stepped from the cutout while extending thereto, the retainer being pressed against the groove.

9. The structure according to claim 1, wherein the seal plate gradually decreases in thickness toward the radially inner end thereof from the jaw portion to form an inclined surface.

10. The structure according to claim 9, wherein the seal plate further comprises:

an arc groove formed to prevent stress concentration on an inner corner between the jaw portion and a body plate; and a chamfer formed at an outer corner of the jaw portion where the stepped portion and the inclined surface meet.

11. The structure according to claim 10, wherein the turbine rotor disk further comprises:

an arc groove formed at a concave corner of the mounting groove stepped portion; and a chamfer formed at a convex corner of the mounting groove stepped portion.

12. The structure according to claim 1, wherein the insertion pin comprises:

a cylindrical body; and a head integrally formed on one side of the body to have a larger outer diameter than the body.

13. The structure according to claim 1, wherein the seal plate is formed as a single component.

14. The structure according to claim 1, wherein the seal plate comprises a second surface that abuts the mounting rib, the second surface comprising a flat surface parallel to the vertical plane of the mounting groove.

15. A gas turbine comprising:

a compressor configured to suck and compress outside air;

a combustor configured to mix fuel with the air compressed by the compressor to burn a mixture thereof; and a turbine rotating by combustion gas discharged from the combustor, wherein the turbine comprises:

a turbine blade comprising an airfoil, a platform, and a root;

a turbine rotor disk to which the root of the turbine blade is mounted;

a seal plate mounted between the platform and one side of the turbine rotor disk to seal a cooling channel defined within the root and the platform; and an insertion pin inserted axially through the turbine rotor disk to fix the seal plate to the turbine rotor disk by supporting the seal plate, wherein the turbine rotor disk has a mounting groove into which a radially inner end of the seal plate is inserted, a mounting rib extending radially from one axial side thereof to form the mounting groove between the turbine rotor disk and the mounting rib, and a through-hole formed axially through the mounting rib to permit insertion of the insertion pin, and wherein:

the seal plate has a jaw portion radially supported by a stepped portion of the mounting groove, the seal plate further comprising a body plate having a first side and an opposing second side;

the turbine rotor disk comprises a first vertical surface that abuts the first side of the seal plate;

the mounting rib comprises a second vertical surface parallel to the first vertical surface that abuts the second side of the seal plate, and the seal plate is positioned entirely to one side of the second vertical surface.

16. The gas turbine according to claim 15, wherein the seal plate comprises a pin groove formed at the radially inner end thereof corresponding to the through-hole of the mounting rib.

17. The gas turbine according to claim 16, wherein:

the seal plate gradually decreases in thickness toward the radially inner end thereof from the jaw portion to form an inclined surface, and the seal plate further comprises an arc groove formed to prevent stress concentration on an inner corner between the jaw portion and a body plate, and a chamfer formed at an outer corner of the jaw portion where the stepped portion and the inclined surface meet; and the turbine rotor disk further comprises an arc groove formed at a concave corner of the mounting groove stepped portion, and a chamfer formed at a convex corner of the mounting groove stepped portion.

18. A structure for assembling turbine blade seals, comprising:

a turbine blade comprising an airfoil, a platform, and a root;

a turbine rotor disk to which the root of the turbine blade is mounted;

a seal plate mounted between the platform and one side of the turbine rotor disk to seal a cooling channel defined within the root and the platform;

an insertion pin inserted through the turbine rotor disk to fix the seal plate to the turbine rotor disk by supporting the seal plate, and a retainer;

wherein:

the turbine rotor disk comprises:

a mounting groove into which a radially inner end of the seal plate is inserted;

a mounting rib extending radially from one axial side thereof to form the mounting groove between the turbine rotor disk and the mounting rib; and a through-hole formed through the mounting rib to permit insertion of the insertion pin;

the seal plate comprises:

a jaw portion radially supported by a stepped portion of the mounting groove; and a pin groove formed at the radially inner end thereof corresponding to the through-hole of the mounting rib;

the retainer is inserted into the through-hole of the mounting rib together with the insertion pin to fix the insertion pin and prevent the insertion pin from falling out; and the insertion pin comprises:

a cylindrical body;

a head integrally formed at one side of the body to have a larger outer diameter than the body; and a cutout formed on the bottom of the body and the head so that the retainer is pressed against the cutout; and a groove formed on the head, the groove being stepped from the cutout while extending thereto, the retainer being pressed against the groove.

19. The structure according to claim 18, wherein the turbine rotor disk comprises a head receiving hole formed on one side of the through-hole thereof and having a larger inner diameter than the through-hole, so that the head of the insertion pin is received in the head receiving hole.

20. The structure according to claim 19, wherein the retainer is formed by bending a rectangular plate, and comprises:

a horizontal portion that is bendable by plastic deformation;

a stepped portion connected from the horizontal portion in a stepped manner; and a vertical portion bent vertically from the stepped portion.

21. The structure according to claim 20, wherein the head of the insertion pin is supported by a bent portion formed by bending a portion of the horizontal portion after the retainer is inserted into the through-hole of the mounting rib and the insertion pin is then inserted into the through-hole.

22. The structure according to claim 21, wherein the bent portion is bent and then disposed inside the head receiving hole.

* * * * *